Figure 1:
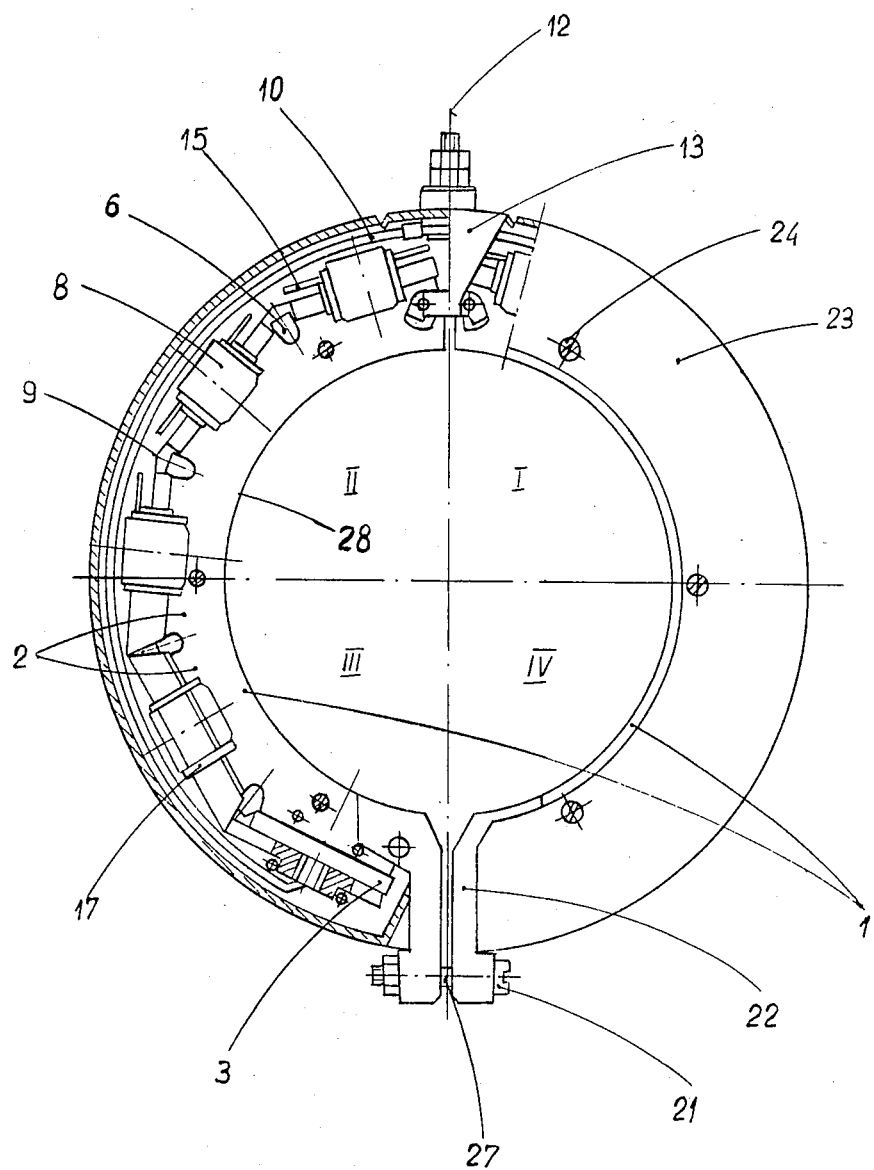

United States Patent [19]

Sikora et al.

[11] Patent Number: 4,723,070
[45] Date of Patent: Feb. 2, 1988

[54] ELECTRIC HEATER ESPECIALLY FOR MACHINES AND TOOLS FOR PROCESSING OF PLASTICS

[75] Inventors: Robert Sikora, Lublin; Jerzy Tomaszewski, Bydgoszcz; Irena Wlodarczyk, Lódz, all of Poland

[73] Assignees: Lodzkie Zaklady Termotechniczne "Techma-Elcal", Dabroskiego; Akademia Techniczno-Rolnicza im Jana, Olszewskiego, both of Poland

[21] Appl. No.: 877,017

[22] Filed: Jun. 20, 1986

[30] Foreign Application Priority Data

Jun. 24, 1985 [PL] Poland .................................. 254142

[51] Int. Cl.$^4$ ............................................. H05B 3/58
[52] U.S. Cl. .................................... 219/535; 219/420; 219/421; 219/422; 219/423; 219/424
[58] Field of Search .......................... 219/420–424, 219/535

[56] References Cited

U.S. PATENT DOCUMENTS

| 4,292,503 | 9/1981 | Brent | 219/535 |
| 4,438,325 | 3/1984 | Gellert | 219/536 |
| 4,449,038 | 5/1984 | Reich et al. | 219/535 |
| 4,451,974 | 6/1984 | Gellert | 29/611 |

FOREIGN PATENT DOCUMENTS

| 3246845 | 12/1983 | Fed. Rep. of Germany | 219/535 |
| 106110 | 2/1980 | Poland | 219/535 |
| 238827 | 11/1982 | Poland | 219/535 |

*Primary Examiner*—Clifford C. Shaw
*Assistant Examiner*—Gerald E. Preston
*Attorney, Agent, or Firm*—Ladas & Parry

[57] ABSTRACT

A heater has two, hollow, half-cylindrical heat guides fastened to each other at one side by an articulated connector and at the other side by a bolted joint. Internal surfaces of the heat guides represent the shape of the object being heated. On external surfaces of the heat guides, there are a series of, preferably flat splines. Lamellar heating elements are fastened to the splines. Mutual adherence surfaces of the heating elements and splines are shaped according to geometrical patterns, the appropriate selection of which changes the thermal characteristics of the heater over a wide range. The heater may be supplied from single- or three-phase mains. The heater is applicable especially for heating the cylinders, nozzles and tools of injection moulding and extrusion machines.

5 Claims, 4 Drawing Figures

ELECTRIC HEATER ESPECIALLY FOR MACHINES AND TOOLS FOR PROCESSING OF PLASTICS

The subject of the present invention is an electric heater especially for machines and tools for processing of plastics. Said heaters are placed usually directly on the object being heated such as a cylinder, a nozzle, a head, a mould, especially on external surfaces of objects. Their task is to maintain the required thermal regime in plastics being in motion in the mentioned objects in order to plasticize them properly or to melt or to dolidify or to harden them.

Heaters known from Polish patent specifications Nos. 106 110 and P-238 827 and the GFR patent specification No. DE 3246 844 C2 are made of heating segments consisting of three substantial elements, namely, a resistance heating element showing semiconductor properties, a heat guide directly abutting the heating element from the non-conducting side, and a heat radiation reflector located over the heating element. An appropriate amount of said segments are situated in a casing and through connecting rings and the clamping tape of the casing they are held down and fixed in this way on the object being heated.

A disadvantage and an inconvenience of the known heaters is low accuracy of fixing them on the object being heated, what causes disturbances in the heat flux flowing to plastics being heated and impairs conditions of the course of the process and quality of the product. A disadvantage is also that the hitherto known solutions have a rather complicated design, what considerably hinders execution thereof, and especially assembly of both themselves and on the object being heated.

The aim of the invention is to obtain a heater devoid of the mentioned disadvantages and to obtain a design characterized not only by simplicity and easier assembly, better adherence and holding-down to the object being heated, but also by high watt-hour efficiency, high stability of parameters during the process, higher durability and operational reliability, and, moreover, adaptability of the heat flux.

The essence of the invention consists in that the substantial constructional part of the electric heater is a heat guide consisting of two halves of a hollow cylinder, connected with each other at one side in a self-aligning way, that is, in a way enabling their opening to the outside, and at the other side by means of connecting elements of adjustable holding-down, enabling sufficient clamping of the heat guide on the object being heated. The internal surfaces of the hollow cylinder copy the shape of the object being heated and are so smooth as to enable accurate adherence of heat guides to the surface of the object. This enables free heat flux from guides to the object. On the external surface of heat guides there is an appropriate number of splines, preferably flat, formed by grooves led along the generator of the cylinder. On the surface of said splines heating elements are placed with their non-conducting sides directed thereto. They are fixed in relation to the splines in the circumferential direction by means of linear shaped elements placed in grooves. On the other hand, in the direction of the generator they are fixed by means of angular shaped elements held down to faces of the cylinder. Both types of the shaped elements are made of an electroinsulating material, preferably of electrical porcelain. The angular shaped element has on its external surface parallel to the surface of the heating element a spline with a port inside therein perpendicular to the said surface. The said spline is a fixing element for a reflector, preferably made of one piece of a formed tape for the whole half of the heater, held down to the external surface of the angular shaped element above the heating element. Angular shaped elements are held down to contacts of heating elements in the place of current electrodes, wherefrom the element conducting electric current is led out from under the shaped element with a port in the spline. The element holding down the whole set: the reflector to the shaped element, the shaped element to the heating element, and the heating element to the spline, is an elastic stirrup made preferably of elastic wire. At one side the stirrup is engaged in two holes situated at the base of splines, on the butting faces of heat guides, and at the other side it encircles the spline of the angular shaped element. Each of heat guides, with all necessary elements mounted in, is enveloped in an independent casing fixed only to the butting faces of the heat guide. Fixing and fastening of heat guides in relation to one another, along the generator, is provided for by a self-aligning connector, and fastening alone and holding-down to the object being heated is enabled, preferably, by a bolted joint through rigid outriggers. Said outriggers are fastened at one end to heat guides, and at the other end they have preferably at least one hole in common, co-operating with the bolt. Besides, said outriggers are fastened to heat guides oppositely in such a way that always between them an appropriate distance remains, which enables adjustment of holding-down of the heater to the object being heated. Contacting surfaces of the heating element and the heat guide are shaped preferably in geometrical patterns. An advantageous effect of the invention is that shaped or flat surfaces of splines of the heat guide and heating elements adhering to each other enable obtaining various heating characteristics within a wide range. Said surfaces shaped according to various geometrical patterns and mutual combinations thereof enable building of heaters having various thermal characteristics at the same power values of heating elements, especially having higher watt-hour efficiency, high stability of parameters in time, considerable durability and operational reliability.

A further advantage of the heater according to the invention consists in that it has no restrictions with regard to single- or three-phase alternating current supply or direct current supply, whereby heating elements may be supplied with introduction of permanent terminals outside the reflector or with terminals under the reflector in an in-series arrangement. The design of self-aligning heat guides ensures good adherence of the heater to the object being heated, what gives a stable heat flux without local overheatings or underheatings of the stream of plastics being heated. This design ensures good adherence of the heater to large surfaces being heated, and even those formed of different combinations of surfaces, that is, flat, cylindrical, spherical and similar ones. It ensures also easy putting on and removal of the heater from the object without the necessity of disassembling the neighbouring heaters or other tools.

Due to separation of the casing and assigning it only with the protective function, an easy access to the interior of the heater has been achieved in the case of maintenance or a repair, without the necessity of disassembling it. This enables only enveloping with one casing several heaters situated beside one another.

Figure 2:
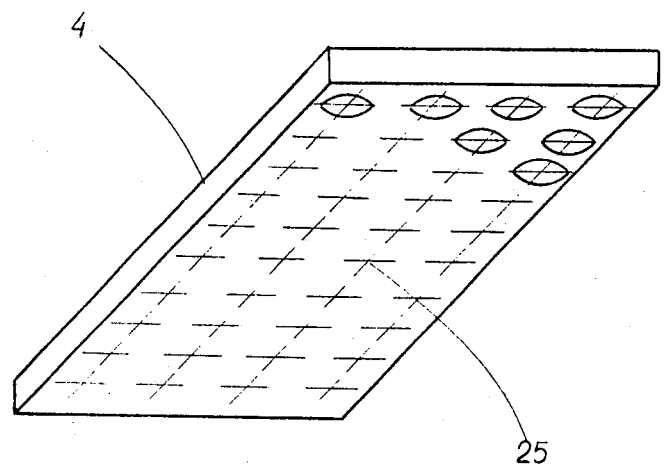
Figure 3:
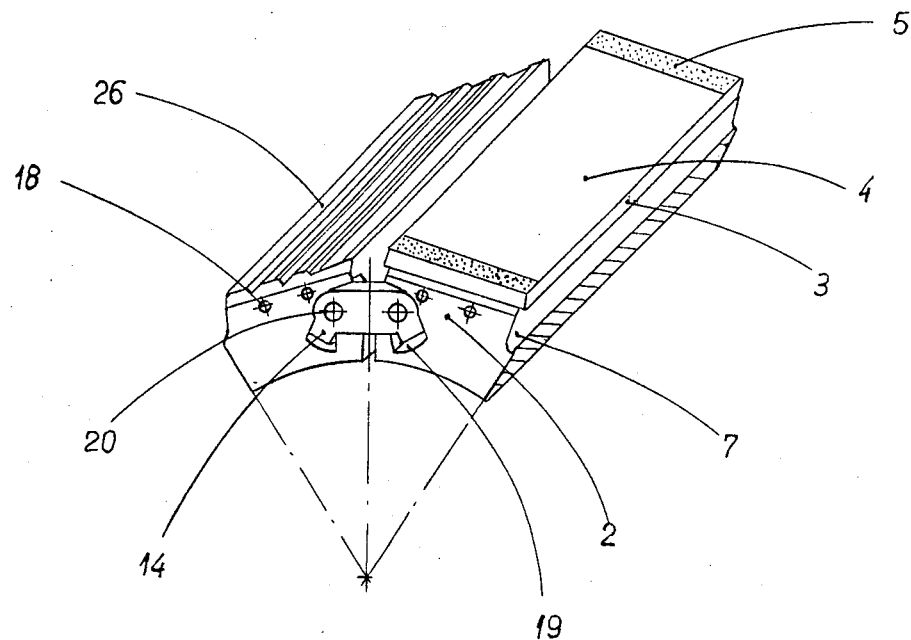
Figure 4:
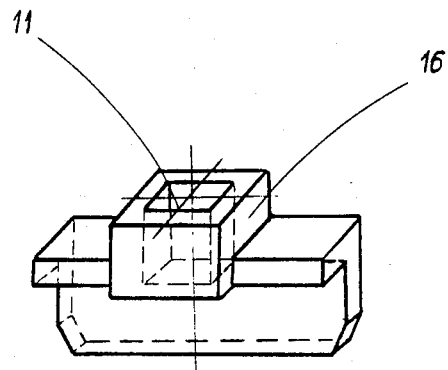

The subject of the invention is presented in an example of its realisation in drawings, in which FIG. 1 shows the front view of the heater with a partial cut-out to illustrate the view of the heater under the casing and with the section through the sector of the heater in the IIIrd quadrant, FIG. 2 shows the oblique projection of the shaped surface of a heating element, FIG. 3 shows the oblique projection of the self-aligning connection of the two halves of heat guides, and FIG. 4 shows the oblique projection of the angular shaped element.

The annular heater presented as an example of its realisation consists of two heat guides 1 in the form of half-rings adhering each other along generators. The heat guide 1 is made of metal and has in its external surface five flat splines 2. To surfaces of splines 2, shaped according to a geometrical pattern 26, heating elements 3 adhere with their non-conducting surfaces, shaped according to geometrical patterns 25, said heating elements 3 being made in the form of a silica glass plate with deposited thereon—on the surface opposite to the adherence surface—a thin film of $Sn_2$ and Sb, in which electric energy is converted into thermal energy. Along the short edges electrodes 5 made of solver paste are applied, which feed electric current to the said film. Heating elements 3 are fixed in relations to splines 2 in the circumferential direction by means of linear shaped elements 6 made of electrical porcelain, placed in grooves 7 of the heat guide 1. On the other hand, in the direction of the generator the heating elements 3 are fixed by means of angular shaped elements 8 made of electrical porcelain as well. Heating elements 3 are connected among themselves in series by means of a metal tape 9. From the terminal heating elements 3 conductors 10 are led out through ports 11 in angular shaped elements 8 to supply terminals 12 fastened on brackets 13 attached in turn to connectors 14. Over the conducting surface 4 of the heating element 3 a reflector 15 rests, supported on angular shaped elements 8 at the required distance from the conducting layer, said reflector 15 being fixed over heating elements 3 due to holes on its rims, fit to splines 16 in angular shaped elements 8. The reflector 15 is shown in the IInd quadrant in the front view of the electric heater in its realisation of single elements, and in the IIIrd quadrant from the total sheet metal strip appropriately shaped.

The set: the reflector 15, the angular shaped element 8 and the heating element 3, is fastened with appropriate holding-down to the spline 2 by means of an elastic stirrup 17. The elastic stirrup 17 is engaged at one side in two holes 18 made at the base of splines 2.

For combining the heater into one entirety the heat guides 1 are provided with a shaped recess 19 in which a connector 14 is pivotally attached on pins 20, which ensures articulated motion of heat guides 1 in relation to each other. Such an articulated connection of heat guides 1 enables putting the heater in any place on the object being heated, without the necessity of sliding it onto the object from the front. The heater is held down by means of bolted joints 21 through outriggers 22 made of metal and rigidly fastened to heat guides in such a way that always between them a gap 27 remains to enable adjustment of holding-down of the heater to the object being heated. Each of heat guides together with all elements mounted in is enveloped in a casing 23 fastened only to butting faces of heat guides 1 by means of bolts 24.

What is claimed is:

1. An electric heater, especially for machines and tools for processing of plastics, in which the source of heat is a resistance heating element made of technological glass or a ceramic material coated with a film of chemical compounds showing semiconductor properties, provided with a reflector and a heat guide, characterized in that its heat guide 1 consists of two halves of a hollow cylinder, connected with each other at one side in a self-aligning way, and at the other side by means of connecting elements 21 and 22 with adjustable holding-down, whereby the internal surfaces 28 of halves of the hollow cylinder represent the shape of the object being heated, and on their external surface there is an appropriate number of splines 2 formed by grooves 7 led along the generator of the cylinder, comprising linear electroinsulating shaped elements 8 fixing on splines 2 the heating elements 3 which are held down to splines 2 on butting faces of the heat guide 1 by angular electroinsulating shaped elements 8 setting at the same time the distance between the reflector 15 and the heating element 3 by means of elastic stirrups 17 fixed at one side in holes 19 on butting faces of the heat guide 1 and enclosing at the other side the spline 11 of the annular shaped element 8 and holding down the reflector 15 thereto, whereas the whole of the heater is enveloped by at least two-piece casing 23 detachably fastened to heat guides 1 on their butting faces.

2. A heater according to claim 1, characterized in that contacting surfaces 25 and 26 of the heating element 3 and the heat guide 2 have thereon shaped geometrical patterns.

3. A heater according to claim 1, characterized in that the angular ceramic shaped element 8 setting the distance between the heating element 3 and the reflector 15, made in the form of letter L, has on one external surface a fixing spline 16 which is provided with a port perpendicular to the surface of the angle section.

4. A heater according to claim 1, characterized in that it has one reflector 15 in common for all heating elements 3 in both halves.

5. A member for a heater, comprising:
   a hollow, half-cylindrical heat guide (1), whereby to be arranged end-to-end, in mirror image with another thereof for forming a cylindrical heater, the heat guide (1) having a concave surface (28), whereby to form an internal surface of the cylindrical heater, the concave surface being for representing a shape of an object to be heated by the cylindrical heater, and an opposite, external surface;
   at least one spline (2) on the external surface of the heat guide, the spline having a geometrically-patterned adherance surface (26); and
   a resistance heating element (3) having a geometrically-patterned adherance surface (25) on the geometrically-patterned adherance surface (26) of the spline (2), whereby selection of the geometrical patterns of the geometrically-patterned adheranced surfaces (25,26) changes the thermal characteristics of the heater over a wide range.

* * * * *